Aug. 23, 1949.    G. C. LEACH ET AL    2,479,579
GRINDING MACHINE
Filed Nov. 2, 1945    4 Sheets-Sheet 1
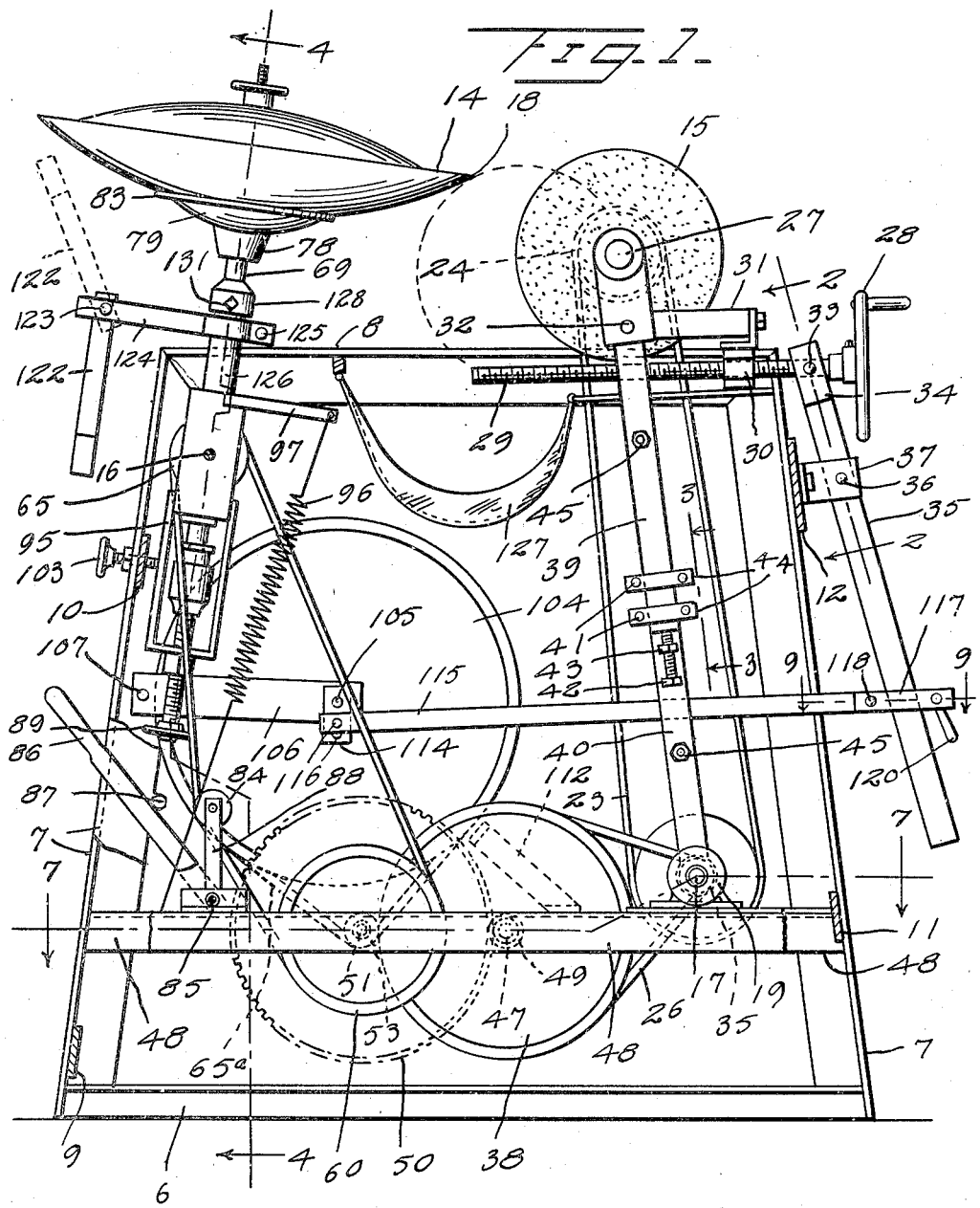
Inventors
G.C. Leach
R.T. Leach
By
Kimmel & Crowell Attorneys

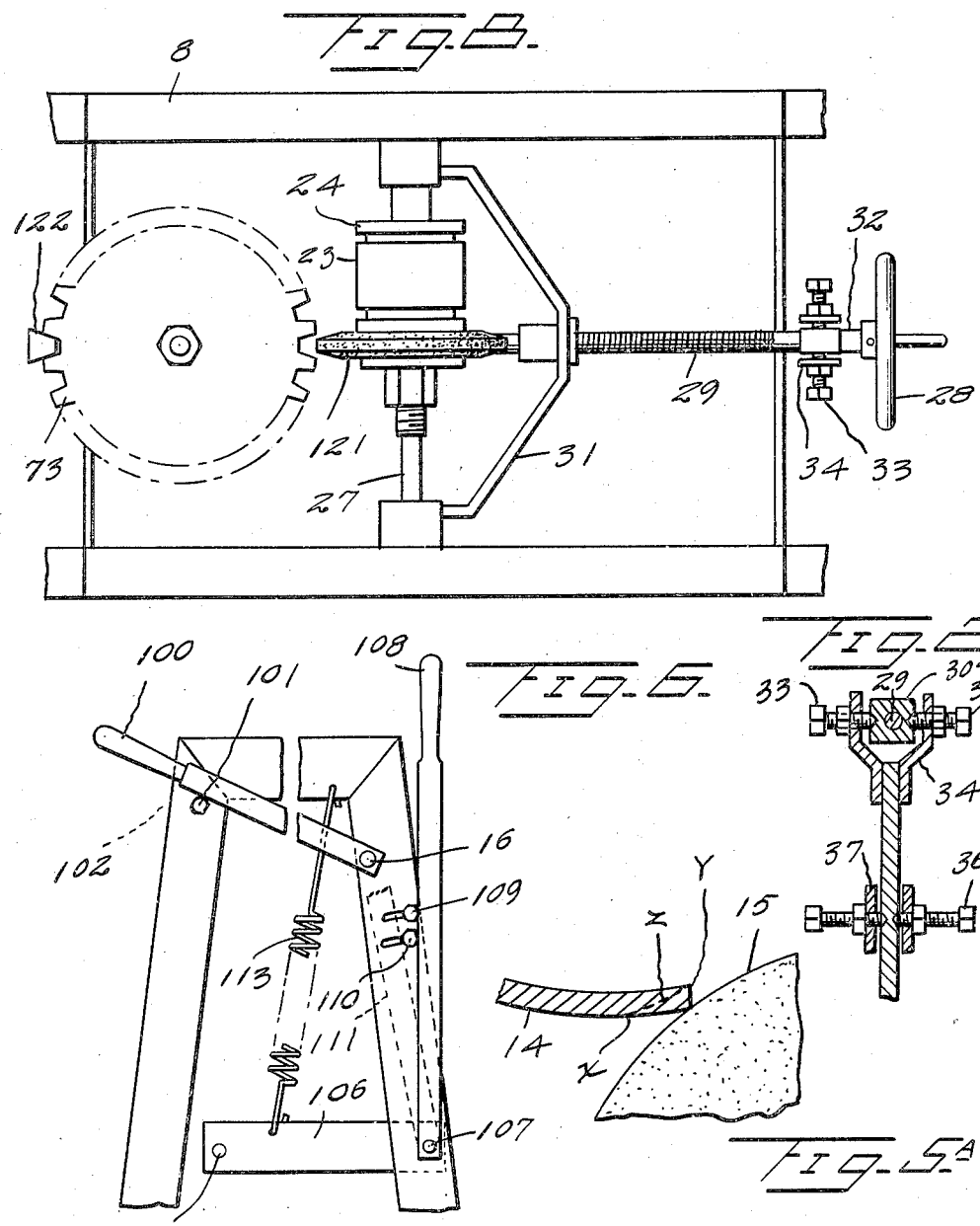

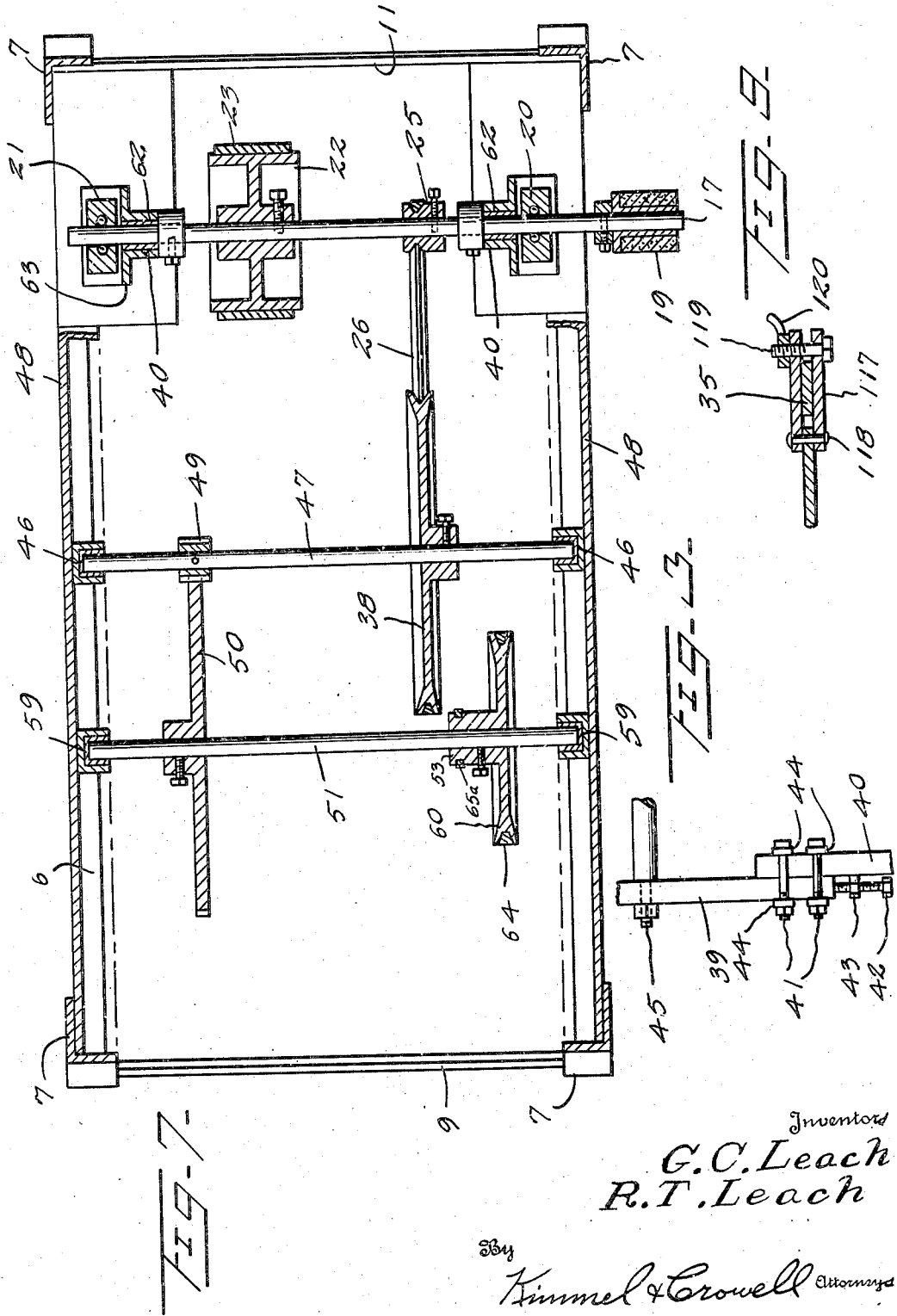

Aug. 23, 1949.    G. C. LEACH ET AL    2,479,579
GRINDING MACHINE
Filed Nov. 2, 1945    4 Sheets-Sheet 4
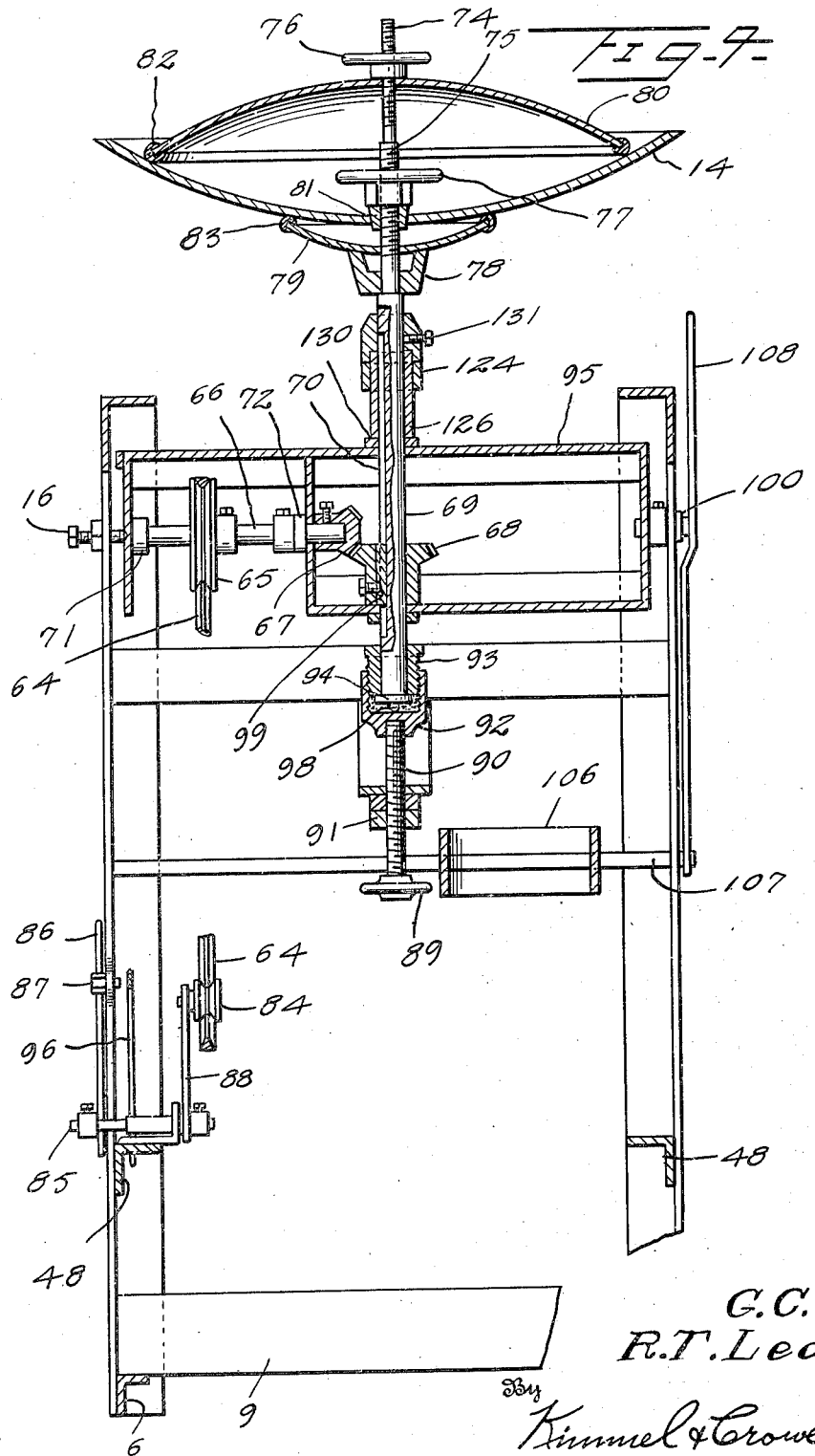
Fig-7-
Inventors
G. C. Leach
R. T. Leach
By Kimmel & Crowell  Attorneys Patented Aug. 23, 1949

2,479,579

UNITED STATES PATENT OFFICE 2,479,579

GRINDING MACHINE

Grover Cleveland Leach and Richard Thomas Leach, Brownwood, Tex.

Application November 2, 1945, Serial No. 626,407

4 Claims. (Cl. 51—33)

This invention relates to grinding machines and more particularly to a machine especially designed for automatically grinding and sharpening the ground engaging discs of agricultural machinery as well as cutting teeth in gears.

The primary object of the invention is to efficiently and economically sharpen discs in such a way that the maximum utility, durability, and efficiency is obtained from them and the machinery on which they operate. The old methods of beating or rolling the disc to a thin edge cause the edge of the disc to expand or stretch thus changing the concave shape of the disc as well as flattening and thinning the outer rim for two or more inches. This destroys the balance and strength of the disc, leaving no means of support at the outer rim where support is so necessary. When the disc is placed in the ground, the strain is moved upward toward the center of the disc and any jar, such as caused by hitting a rock or stump, will cause either or both the disc and the cast spool or hub of the disc to break, and in certain instances the thinned rim of the disc will split or curl back. Either of these old methods will overheat the metal and change the temper.

Another object is to provide a means for cutting gears, especially those that have been repaired and need refinishing.

Still another primary object of the invention is to provide a utility grinder when disc-grinding is not being done.

The attached drawings illustrate the basic principles around which this machine was designed and carry out one way in which these principles can be applied.

In the drawings:

Figure 1 is a side elevation, partly in section, of the automatic disc grinding machine, Figure 2 is a vertical sectional view taken on the line of 2—2 of Figure 1, Figure 3 is a side view taken on the line 3—3 of Figure 1, Figure 4 is a vertical sectional view taken on line 4—4 of Figure 1, Figure 5A is part of a cross sectional view of the ground and sharpened edge of a disc while Figure 5 illustrates why this type of curved edge is ground with this machine, Figure 6 is a partial side view opposite from that of Figure 1 showing certain lever actions to permit changing discs without stopping the motor, Figure 7 is a transverse sectional view taken on line 7—7 of Figure 1.

Figure 8 is a partial top view showing the gear cutting arrangement with a gear replacing the plow disc and a cutter replacing the regular disc grinding wheel, and Figure 9 is a sectional view taken on line 9—9 of Figure 1.

The improved automatic grinding machine with gear cutting attachment is comprised of a main supporting frame made up of angle iron sills 6, Figure 1, converging uprights 7, secured thereto and connected by top sills 8. These sills and uprights are properly tied together by transverse braces 9, 10, 11, and 12. Other convenient supporting means could be provided. Added to this framework is the internal mechanism, all of which go to make up the machine.

The basic operation of the disc grinder depends on revolving a plow disc 14, Figures 1 and 4, and a grinding wheel 15 in planes at right angles to each other with each revolving unit being mounted on controlled parallel pivots 16 and 17. When revolving grinding wheel 15 comes in contact with plow disc at point 18, a grinding action takes place which, when under proper control, suitably sharpens plow disc 14.

The various drives and controls that make the above action practical are hereinafter described in detail along with the important auxiliary use of cutting gear teeth.

A motor (not shown), suitably mounted outside the disc grinder frame, drives pulley 19, Figure 7, mounted on shaft 17, Figures 7 and 1, in a counterclockwise direction as viewed in Figure 1. Two belted drives take off from shaft 17 journalled in bearings 20 and 21, Figure 7. One drive goes by way of pulley 22, Figures 7 and 1, and one through pulley 25.

Pulley 22, through belt 23, drives pulley 24. Pulley 24 is mounted on shaft 27, which in turn drives grinding wheel 15.

In order to manually adjust grinding wheel 15 with relation to plow disc 14, a hand wheel 28 is mounted on screw 29 threaded in nut 30 which is rigidly fastened to swinging yoke 31. The free end of yoke 31 is pivotally connected at 32 to the upper grinding wheel supporting posts 39.

Screw 29 swivelly turns in stationary box 30a, which is pivotally mounted between pivot screws 33 in small yoke 34 of arm 35. This arm is in turn pivotally mounted in pivots 36, anchored in bracket 37 which is rigidly mounted to the framework 12. The part pivot 36 plays in automatically operating the in and out motion of the grinding wheel, in order to get the desirable wide bevel shown in Figure 5a, will be explained in connection with the drive system associated with pulley 25. In order to tighten belt 23, both pivoting posts that support the grinding wheel unit are made up of sections 39 and 40. These two sections on each post are held together by U-bolts 41 engaging straps 44 on each post which when tightened, hold the sections 39 and 40 rigidly together. Adjustment screw 42 working through stationary nut 43 carried by section 40 and bearing against lower end of 39, provides a simple yet effective method of tightening belt 23. The lower sections 40 that help make up the upright supporting posts, pivot on oversize sleeves 62 welded to bearing brackets 63. Tie bolts 45 hold the pairs of sections 39 rigid with relation to each other.

Pulley 25 drives reducing pulley 38 through V belt 26. Pulley 38 is rigidly mounted on shaft 47 journalled in replaceable bearings 46 fastened to the horizontal supports 48. The reducing drive between shafts 47 and 51 is carried out by gear 49 rigidly mounted on shaft 47 and gear 50 rigidly mounted on shaft 51. When machine is in operation, shaft 51 is thus always in motion.

Continuing with this major drive system, as shaft 51 is turning, pulley 60 also turns as it is rigidly mounted to shaft. Now, through belt 64, pulley 60 drives pulley 65, which is rigidly mounted on shaft 66. Shaft 66 is journalled in bearings 71 and 72 and also carries bevel gear 67 on one end which meshes with keyed gear 68. Gear 68 slides on and drives shaft 69. On the upper end of shaft 69 is mounted the plow disc 14, or the gear 73. At times, when discs are being changed and teeth are being cut in gears, it is desirable to stop rotation of shaft 69. In order to do this, lever 86 is disengaged from stop 87. Since lever 86 is fixed rigidly to short shaft 85 and lever 88 which carries idler pulley 84 is also rigidly fastened to shaft 85, belt 64 is allowed to slip because of lack of tension when lever 86 is raised thus moving idler 84 to the right. As mentioned before, the entire disc unit which is built upon and into framework 95 pivots at points 16. This action is necessary both for adjusting the disc with relation to the grinding wheel before operation and to allow disc to freely follow or ride the grinding wheel during the sharpening operation. The disc is held in proper contact with grinding wheel by tension spring 96, which causes the disc to pivot forward toward the grinding wheel because of the fact that it is attached off-center to extending bracket 97. To compensate for discs of various diameters as well as for the grinding wheel as it gets smaller, provision is made for lowering or raising the disc 14 by shaft 69. After loosening lock nut 91 and set screw in gear 68, hand knob 89 can be turned. Screw 90 is secured to part 92 which carries retainer nut 93. The part 92 is then fixed relative to the frame 95. Shaft 69 has on its lower end a head 94 which rests on thrust ball 98 and which keeps it in this position because of retainer nut 93. It is readily seen that by turning knob 89, shaft 69 is lowered or raised and yet is always in driving contact with gear 68 by means of keyed drive 99 working in slot 70. Key 99 is countersunk to take set screw in gear 68 to prevent it from falling out when set screw is loosened. In changing discs, it is desirable to lift the disc off the grinding wheel. This is done by lever 100, Figure 6 and Figure 4. Lever 100 is securely welded to end of pivot 16 which in turn is rigid with relation to framework 95. Thus, when lever 100 is in its lower position shown at 102, and is engaged above stop 101 as shown in Figure 6, plow disc is raised away from grinding wheel. When truing up the diameter of a disc, its edge is adjusted until it is approximately perpendicular to the face of the grinding wheel. In addition, it is also necessary to disengage the grinding wheel assembly from the pulley 104 to stop the "in and out" movement to be explained later. When this adjustment has been made, the entire disc unit should be held in a rigid position. This is accomplished by adjustment screw 103, Figure 1, which works against framework 95 and in opposition to action of spring 96.

In mounting a disc ready for grinding, it is first slipped over the threaded end of shaft 69, and is settled against baffle disc 79 which rests on a conical support 78. Baffle disc 79 carries on its circumference a rubber vibration absorbing ring 83. Between the small baffle disc 79 and the large baffle disc 80 which also carries a rubber ring 82, about 80% of the noise and vibration is eliminated. Conical shim 81 is next dropped over shaft and into disc hole, thus automatically centering disc 14 with the axis of shaft 69. This conical shim permits the sharpening of discs having various sizes of holes. Hand wheel 77, which has an integral screw thread, rigidly clamps plow disc 14 into position. Large baffle disc 80 is next put on and is held in position by hand knob 76 which screws on small threaded portion 74 of shaft 69. The reason for the reduction in size on top end of shaft 69 is to save time in screwing on hand wheel 77, which would otherwise have to be screwed all the way from the top of the shaft.

An important improvement on this disc grinder and the final necessary action that makes it automatic is the drive developed for automatically moving grinding wheel 15 in and out under the plow disc 14 in order to grind a long curved bevel illustrated in Figure 5A. Going back to shaft 51, it is noted that pulley 53 drives the large pulley 104 by means of belt 65a. This large pulley 104 is rigidly mounted on shaft 105 which journals in bearings mounted in pivoting bracket 106. Bracket 106 is welded on shaft 107, which in turn pivots in angular uprights 7 of the framework. On occasion it is necessary to stop pulley 104, while shaft 51 continues to rotate. This is done by means of lever 108 which is welded or otherwise connected to an extension of pivoting shaft 107. When engaging with adjustable stop 109, lever 108 tightens belt 65. When engaged with adjustable stop 110 in position 111, belt 65 is loose, which allows it to slip on pulley 53. In this position, pulley 104 is also locked against brake 112 which guards against any possibility of pulley 104 turning. This serves to hold the grinding unit stationary so it can be used to true up discs or as a utility grinder for grinding chisels, axes, etc. Spring 113 acts as a counterbalance for pulley 104 pivoting unit. Welded to the end of shaft 105 is a crank lever 114 to which is pivotally mounted connecting bar 115 that can be fastened at either of mounting holes 116. Thus, it is seen that connecting bar 115 will move back and forth horizontally because of crank action of lever 114 as pulley 104 rotates. Bar 115 is pivotally bradded by pin 118, to clamping bars 117. After position of clamping unit on bar 35 is decided upon, tail nut 120 is tightened on bolt 119 which locks clamping unit in position, but does not interfere with pivoting action at 118. By allowing pivoting actions to take place at 118, 36, 33, and 32, it is seen how the revolving of pulley 104 causes the in and out motion of the grinding wheel. By moving pivot at 116 to outer hole and by locating clamping unit carrying tail nut 120 at different positions on bar 35, the length of the back and forth travel of the grinding wheel can be predetermined. For large thick plow discs this travel needs to be more than that required for small thin discs.

The particular motion through which the grinding wheel goes in moving in and out is very important in determining whether or not an arc is formed between X and Y, Figure 5a, and not just a straight flat surface that would weaken the cutting edge of the disc. The particular action employed causes the grinding wheel to cut more at X and Y, Figure 5, than at Z, thereby giving the curved bevel. Why this is done is seen by examining the diagram of Figure 5. This shows the time element as compared to the element of travel of the crank 114 as it affects the grinding wheel. The circle W represents the travel of the crank while A, B, C and D translate this travel into comparative time units. In other words, the crank turns ⅛ revolution to cause the grinding wheel to travel the distance A. It also turns ⅛ revolution to cause the grinding wheel to travel each of the distances B, C and D. It is easily seen, therefore, that more grinding action will take place at the extremities of the stroke of crank lever 114 than at right angles to the extremities. Less grinding action at Z than at X and Y means the bevel on the cutting edge of the plow disc has to be curved. The convex ground edge of the disc is obtained not only by reason of the swinging of the wheel 15 but also by reason of the spring-pressed pivoted mounting of the disc supporting shaft 69. In this manner, as wheel 15 swings toward disc 14, the pressure of the grinding on the disc will cause the disc to swing with shaft 69 on a reverse arc.

In practical operation, the 10 inch grinding wheel 15 rotates approximately 2,400 R. P. M. which is standard for this diameter and quality of wheel. The disc 14 is geared to revolve at approximately 24 R. P. M. If the disc turns less than 20 R. P. M. the grinder tends to burn the cutting edge of the disc; if it is allowed to turn over 30 R. P. M. undesirable vibration sets up. The large pulley 104 revolves at approximately 2 R. P. M., or, it takes the grinding wheel ¼ minute to travel one way across the ground bevel X, Z, Y, Figure 5. While this one way travel takes place (¼ minute), the plow disc revolves 6 times. Thus, in moving in and out, the grinding wheel grinds a reducing and increasing concentric spiral on the bevel of the plow disc with most of the grinding taking place at X and Y, Figure 5. This action is best seen and is most valuable in correcting the cutting edge bevel on old discs that have been sharpened by inferior methods. A further reason why the "in and out" movement makes an oval-shaped bevel is that on dull discs, the thickest part of the bevel is at Z and requires more to be ground off at that point. This, and the fact that the grinding wheel stand leans forward towards the disc 14 at the proper angle to cause the grinding wheel 15, Figure 5, to touch the edge of the disc 14 as it does, helps account for the resultant strong bevel shape of the disc's cutting edge.

By making use of shaped grinding wheels 121 or gear cutters in connection with the automatic in and out motion of the grinding head, gears that have had new teeth welded in where broken can be refinished. All baffles are removed from shaft 69 and the repaired gear 73, Figure 8, is mounted in place of the plow disc. The grinding wheel 121 is set in a good tooth gap and adjusted by hand wheel 28, Figure 8, at the time crank lever 114 is at the extremity of its stroke. Next, set indexing bar 122 in another good tooth gap at any convenient point on the periphery of the gear. This can be done by adjusting with clamping bolt 125 and pivot bolt 123. The clamp on the end of bar 124, fits around stationary bearing cuff 126. In cutting the teeth, lever 86 is released so that the disc shaft 69 does not rotate. After one tooth is cut, index bar 122 is pivoted back out of mesh and the gear is turned until the next gap engages with index bar which is again locked with pivoting bolt 123, Figure 1. Gear teeth can, of course, be cut manually by properly operating hand wheel 28.

With all drives disengaged and the disc unit locked back out of the way, the grinding wheel becomes an efficient utility grinder.

As the grinding wheel 15 is set up to revolve toward the disc at its point of contact, all waste tends to fall downward. To catch this waste, flap 127 is provided. This flap extends from one side of the machine to the other with one end lower than the other as shown in order that vibrations will cause all waste to travel toward one side of the machine and out where it can do no harm. Skirted collar 128 immediately below disc on shaft 69, keeps grit out of bearing 130, and can be adjusted up or down by means of set screw 131.

What we claim is:

1. A plow disc grinding machine comprising a frame, a grinding wheel, means swingably supporting said wheel, means for rotating said wheel, a disc supporting shaft rotatably and swingably carried by said frame, means for rotating said disc at a speed different from the speed of said wheel, means operatively connected to said wheel rotating means for oscillating said wheel supporting means and spring means urging said disc supporting shaft toward said wheel whereby to form a rounded bevel on the outer edge of said disc.

2. A plow disc grinding machine comprising a frame, a grinding wheel, means swingably supporting said wheel, means for rotating said wheel, a disc supporting shaft spaced from said grinding wheel, means rotatably supporting said shaft in a plane perpendicular to the plane of rotation of said grinding wheel, spring pressed means swingably mounting said shaft supporting means on said frame, means for rotating said disc, means adjusting said wheel relative to the disc, and means operatively connected to said wheel rotating means for oscillating said wheel supporting means in timed relation to the rotation thereof, whereby to form a rounded bevel on the outer edge of said disc.

3. A plow disc grinding machine comprising a frame, an abrading wheel, means swingably supporting said wheel on said frame, means rotating said wheel, a disc supporting shaft, means rotatably and swingably supporting said shaft on said frame with the axis thereof at right angles to the axis of said wheel and spaced therefrom, spring means constantly urging said latter named means toward said wheel, means rotating said shaft, means operatively connected with said wheel rotating means oscillating said wheel supporting means with rotation of said wheel, and means for adjusting said shaft endwise.

4. A plow grinding machine as set forth in claim 3 wherein said oscillating means includes means for disengaging said oscillating means from said wheel rotating means.

GROVER CLEVELAND LEACH.
RICHARD THOMAS LEACH.

REFERENCES CITED

The following references are of record in the file of this patent:

UNITED STATES PATENTS

| Number | Name | Date |
|---|---|---|
| 221,286 | Copp | Nov. 4, 1879 |
| 398,741 | Morrison et al. | Feb. 26, 1889 |
| 696,945 | Crocker | Apr. 8, 1902 |
| 776,057 | Hammond | Nov. 29, 1904 |
| 781,198 | Hammond | Jan. 31, 1905 |
| 1,436,166 | Hansen | Nov. 21, 1922 |
| 1,563,355 | Fox | Dec. 1, 1925 |
| 1,998,783 | Leach et al. | Apr. 23, 1935 |